(12) United States Patent
Yin et al.

(10) Patent No.: US 11,418,274 B2
(45) Date of Patent: Aug. 16, 2022

(54) MULTIMEDIA SYSTEM APPLYING TIME OF FLIGHT RANGING AND OPERATING METHOD THEREOF

(71) Applicant: Guangzhou Tyrafos Semiconductor Technologies Co., LTD, Guangzhou (CN)

(72) Inventors: Ping-Hung Yin, Taipei (TW); Jia-Shyang Wang, Miaoli County (TW); Teng-Chien Yu, Hsinchu (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 372 days.

(21) Appl. No.: 16/850,024

(22) Filed: Apr. 16, 2020

(65) Prior Publication Data

US 2020/0351004 A1 Nov. 5, 2020

Related U.S. Application Data

(60) Provisional application No. 62/842,448, filed on May 2, 2019.

(30) Foreign Application Priority Data

Jan. 15, 2020 (TW) ................. 109101328

(51) Int. Cl.
*G01S 7/4865* (2020.01)
*H04J 3/06* (2006.01)
(Continued)

(52) U.S. Cl.
CPC .......... *H04J 3/0652* (2013.01); *G01S 7/4865* (2013.01); *G01S 17/06* (2013.01); *G06F 3/011* (2013.01)

(58) Field of Classification Search
None
See application file for complete search history.

(56) References Cited

U.S. PATENT DOCUMENTS

| 10,234,561 B2 * | 3/2019 | Godbaz ................. G01S 17/894 |
| 10,891,745 B1 * | 1/2021 | Potter ................... G01S 17/931 |

(Continued)

FOREIGN PATENT DOCUMENTS

| CN | 103026691 | 9/2015 |
| CN | 107912061 | 4/2018 |
| TW | I535318 | 5/2016 |

OTHER PUBLICATIONS

"Office Action of Taiwan Counterpart Application", dated Sep. 16, 2020, p. 1-p. 6.

*Primary Examiner* — Ajit Patel
(74) *Attorney, Agent, or Firm* — JCIPRNET

(57) ABSTRACT

A multimedia system applying ToF ranging and its operating method are provided. The multimedia system includes a plurality of electronic devices. Each of the electronic devices includes a processing module, a ToF module, and a communication module. The ToF module is configured to perform a ToF operation. The communication module is configured to perform wireless communication. The electronic devices communicate via respective communication modules to formulate an operation protocol and respective UIDs and to perform a time slot synchronization between different electronic devices. The electronic devices sequentially perform the ToF ranging operation according to the operation protocol and the respective UIDs.

8 Claims, 3 Drawing Sheets

(51) Int. Cl.
　　　*G01S 17/06*　　　(2006.01)
　　　*G06F 3/01*　　　(2006.01)

(56)　　　　　References Cited

U.S. PATENT DOCUMENTS

2014/0204793 A1\*　7/2014　Ben-Haim ............ H04L 7/0033
　　　　　　　　　　　　　　　　　　370/253
2016/0261300 A1\*　9/2016　Fei ........................... H04N 5/33
2016/0370462 A1\* 12/2016　Yang ..................... G01S 7/4815

\* cited by examiner

MULTIMEDIA SYSTEM APPLYING TIME OF FLIGHT RANGING AND OPERATING METHOD THEREOF

CROSS-REFERENCE TO RELATED APPLICATION

This application claims the priority benefits of U.S. provisional application Ser. No. 62/842,448, filed on May 2, 2019 and Taiwan patent application serial no. 109101328, filed on Jan. 15, 2020. The entirety of each of the above-mentioned patent applications is hereby incorporated by reference herein and made a part of this specification.

BACKGROUND

Technical Field

The disclosure relates to a ranging technology, and in particular to a multimedia system applying time of flight (ToF) ranging and an operating method thereof.

Description of Related Art

In a virtual reality (VR) system, an augmented reality (AR) system, or other multimedia systems that are interactively operated by a plurality of wearable electronic devices, information of distances between the wearable electronic devices is obtained by each of the wearable electronic devices transmitting positioning data back to a main control server for analysis and calculation, and the main control server then transmits the corresponding distance information to the wearable electronic devices, respectively. The acquisition of the distance information between the wearable electronic devices requires a large amount of data calculation time and data transmission time, which easily leads to delays during the interactive operations and continues to occupy parts of calculation resources of the main control server. In view of the above, several embodiments are proposed below.

SUMMARY

The disclosure provides a multimedia system applying ToF ranging and an operating method thereof, whereby each of a plurality of electronic devices in the multimedia system is enabled to effectively perform a ToF ranging function.

According to an embodiment of the disclosure, a multimedia system applying ToF ranging includes a plurality of electronic devices. Each of the electronic devices includes a processing module, a ToF module, and a communication module. The ToF module is coupled to the processing module and configured to perform a ToF ranging operation. The communication module is coupled to the processing module and configured to perform wireless communication. The electronic devices communicate via respective communication modules to formulate an operation protocol and respective unique identifiers (UIDs) and to perform a time slot synchronization between different electronic devices. The electronic devices perform the ToF ranging operation sequentially via respective ToF modules according to the operation protocol and the respective UIDs.

In an embodiment of the disclosure, the operation protocol includes a sequence of a plurality of ToF ranging time slots of the electronic devices, and the ToF ranging time slots are not overlapped with each other.

In an embodiment of the disclosure, the ToF module of each of the electronic devices performs the ToF ranging operation through an indirect time of flight (I-ToF) method. A length of an operation cycle during which each of the electronic devices performs the ToF ranging operation is greater than a length of an I-ToF ranging cycle. The length of the I-ToF ranging cycle is equal to the sum of a time length of sensing light and a time length of data transmission, and the time length of sensing light is greater than the time length of data transmission.

In an embodiment of the disclosure, the ToF module of each of the electronic devices performs the ToF ranging operation through a direct time of flight (D-ToF) method. A length of an operation cycle during which each of the electronic devices performs the ToF ranging operation is equal to a length of a D-ToF ranging cycle. The length of the D-ToF ranging cycle is equal to the sum of a time length of sensing light and a time length of data transmission, and the time length of sensing light is less than the time length of data transmission.

In an embodiment of the disclosure, the multimedia system is a VR system or an AR system.

According to an embodiment of the disclosure, an operating method of the multimedia system applying ToF ranging includes following steps: communicating via respective communication modules of a plurality of electronic devices to formulate an operation protocol and respective UIDs and to perform a time slot synchronization between different electronic devices, and sequentially performing a ToF ranging operation via respective ToF modules of the electronic devices according to the operation protocol and the respective UIDs.

Based on the above, the operating method of the multimedia system applying ToF ranging as provided in one or more embodiments of the disclosure allows the electronic devices in the multimedia system to sequentially perform ToF ranging without signal collision and misinterpretation.

Several exemplary embodiments accompanied with figures are described in detail below to further describe the disclosure in details.

BRIEF DESCRIPTION OF THE DRAWINGS

Reference will now be made in detail to the present preferred embodiments of the disclosure, examples of which are illustrated in the accompanying drawings. Wherever possible, the same reference numbers are used in the drawings and the description to refer to the same or like parts.

DESCRIPTION OF THE EMBODIMENTS

Figure 1:
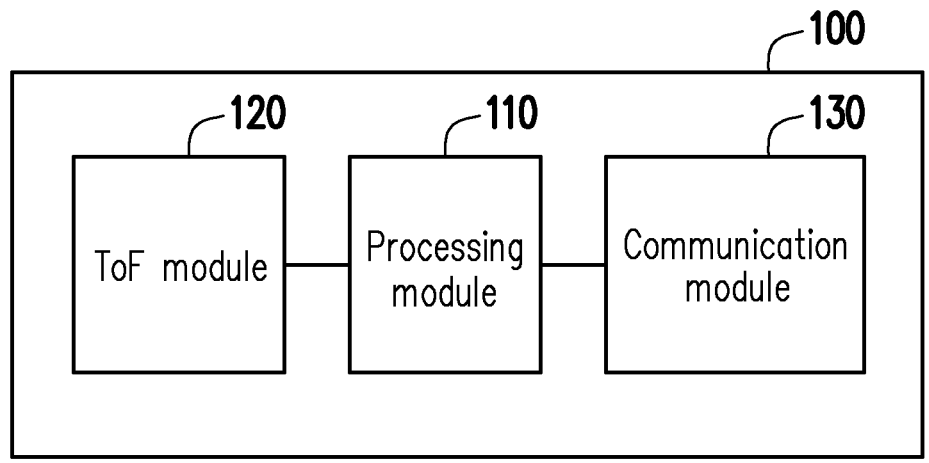
FIG. 1 is a schematic diagram of an electronic device according to an embodiment of the disclosure.

In order to make the content of the disclosure easier to understand, the following specific embodiments are provided as to how the disclosure can be implemented. In addition, wherever possible, the same reference numbers of components/elements/steps are used in the drawings and embodiments to represent the same or similar components/elements/steps.

FIG. 1 is a schematic diagram of an electronic device according to an embodiment of the disclosure. With reference to FIG. 1, an electronic device 100 includes a processing module 110, a ToF module 120, and a communication module 130. The processing module 110 is coupled to the ToF module 120 and the communication module 130. In the embodiment, the electronic device 100 may first communicate with another electronic device via the communication module 130 to formulate an operation protocol and respective UIDs and to perform a time slot synchronization between the two electronic devices. The UID serves to identify the electronic device 100, and the operation protocol includes a sequence of a plurality of ToF ranging time slots based on different UIDs. Therefore, in the embodiment, the processing module 110 of the electronic device 100 may, according to the operation protocol and the respective UIDs, determine the sequence of the ToF ranging time slot corresponding to its own UID, so as to determine a time period during which the ToF module 120 performs ToF ranging.

In the embodiment, the processing module 110 may include, for instance, a central processing unit (CPU), or a programmable general-purpose or special-purpose microprocessor, a digital signal processor (DSP), a programmable controller, an application specific integrated circuits (ASIC), a programmable logic device (PLD), another similar processing device, or a combination thereof. In the embodiment, the communication module 130 is a wireless communication module, such as a Wi-Fi module.

Figure 2:
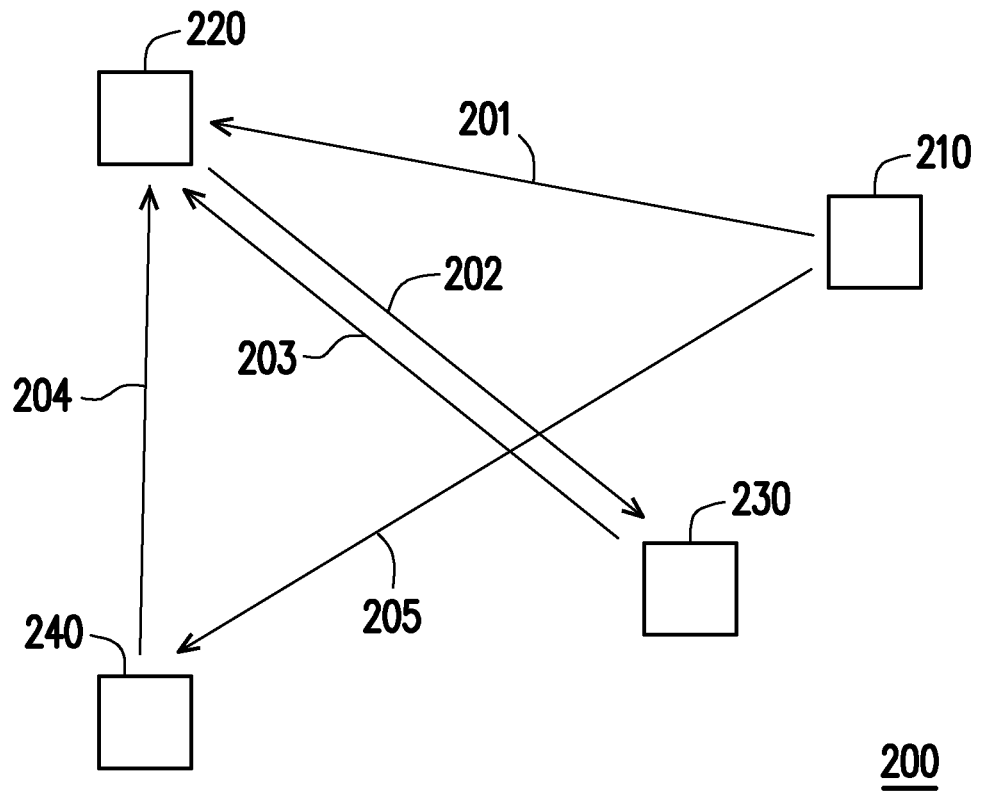
FIG. 2 is a schematic diagram of a multimedia system according to an embodiment of the disclosure.

FIG. 2 is a schematic diagram of a multimedia system according to an embodiment of the disclosure. With reference to FIG. 2, a multimedia system 200 may be, for instance, a VR system, an AR system, etc., and the disclosure is not limited thereto. The multimedia system 200 may include a plurality of electronic devices 210-240, and the electronic devices 210-240 operate in the same VR application program or the same AR application program for interactive operations. In the embodiment, the electronic devices 210-240 may be wearable electronic devices, for instance. Each of the electronic devices 210-240 may include VR or AR modules, related control circuits, and so on, and may also include a plurality of modules in the electronic device 100 as provided the embodiment shown in FIG. 1.

In the embodiment, the electronic devices 210-240 may communicate via respective communication modules to formulate an operation protocol and respective UIDs. The UIDs are configured to identify the electronic devices 210-240, and the operation protocol includes a sequence of a plurality of ToF ranging time slots based on different UIDs. Therefore, the processing module 110 of each of the electronic devices 210-240 may, according to the operation protocol and respective UIDs, determine the sequence of the ToF ranging time slot corresponding to its own UID in the operation protocol, so as to determine a time period during which the ToF ranging is performed by each of the electronic devices 210-240.

For instance, as shown in FIG. 2, the electronic devices 210-240 have established the sequence of performing ToF ranging. Therefore, the ToF module of the electronic device 210 first emits sensing light 201 to a user wearing the electronic device 220, and after receiving the light correspondingly transmitted back, a distance between the user wearing the electronic device 210 and the user wearing the electronic device 220 may be obtained by calculation. Similarly, the ToF module of the electronic device 220 then emits sensing light 202 to a user wearing the electronic device 230 to perform ranging. The ToF module of the electronic device 230 then emits sensing light 203 to the user wearing the electronic device 220 to perform ranging. The ToF module of the electronic device 240 then emits sensing light 204 to the user wearing the electronic device 220 to perform ranging. Since the electronic devices 210-240 may continuously and repeatedly perform ranging, the ToF module of the electronic device 210 performs ranging again according to the sequence of the ranging time slot of the operation protocol and emits sensing light 205 to a user wearing the electronic device 240 (the user wearing the electronic device 210 may turn to another direction) to obtain the current distance between the user wearing the electronic device 210 and the user wearing the electronic device 240.

Accordingly, the electronic devices 210-240 of the multimedia system 200 provided in the embodiment may effectively and quickly obtain the distance therebetween and may also upload the distance information to each other or to a main control server via the communication modules, so as to facilitate the ongoing application operation by timely providing the distance information between the electronic devices 210-240 for performing the corresponding operation.

Figure 3:
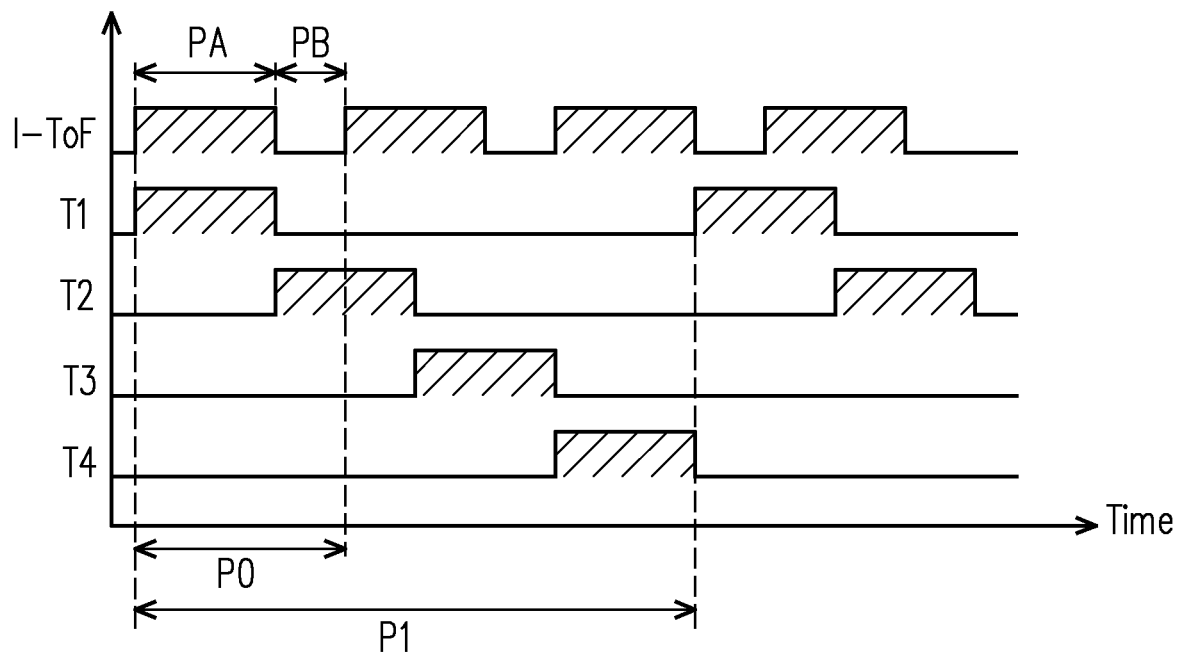
FIG. 3 illustrates an I-ToF signal time sequence according to an embodiment of the disclosure.

FIG. 3 illustrates an I-ToF signal time sequence according to an embodiment of the disclosure. With reference to FIG. 2 and FIG. 3, a time sequence I-ToF represents the time sequence of a periodic ranging operation performed by one single ToF module. According to the time sequence I-ToF, a length P0 of an I-ToF ranging cycle is equal to the sum of a time length PA of sensing light (shown by oblique lines) and a time length PB of data transmission (not shown by the oblique lines). In the embodiment, the time length PA of sensing light refers to the time length of the difference between the time at which a light emitting unit in the ToF module emits the sensing light and the time at which a light sensing unit in the ToF module receives the corresponding reflected light. The time length PB of data transmission refers to the time length of outputting distance data from an analog-to-digital converter (ADC) circuit in the ToF module. In the embodiment, time sequences T1-T4 respectively correspond to the time sequences at which the respectively ToF modules of the electronic devices 210-240 perform the periodic ranging operations.

Here, the ToF module of each of the electronic devices 210-240 performs the ToF ranging operation through the I-ToF ranging method. The I-ToF ranging method is to calculate the distance by calculating a phase difference between a waveform of the sensing light and a waveform of the reflected light; therefore, the required response time is relatively long, and the time length PA of sensing light is greater than the time length PB of data transmission. In other words, since the time length PA of sensing light is greater than the time length PB of data transmission, a length P1 of an operation cycle during which each of the electronic devices 210-240 respectively performs the ToF ranging operation is necessarily greater than a length P0 of an I-ToF ranging cycle.

In detail, with reference to the time sequences T1-T4, only after the light sensing operation by the electronic device 210 is completed, the electronic device 220 continues the light sensing operation. Similarly, after the light sensing operation by the electronic device 240 is completed, the electronic device 210 performs the next round of light sensing operation. In other words, the electronic devices 210-240 may sequentially perform the ranging operation according to the I-ToF ranging method, but the refresh rate descends. In addition, the sequence of the ToF ranging time slots refers to the sequence of the respective light sensing periods (shown by the oblique lines) in the time sequences T1-T4.

Figure 4:
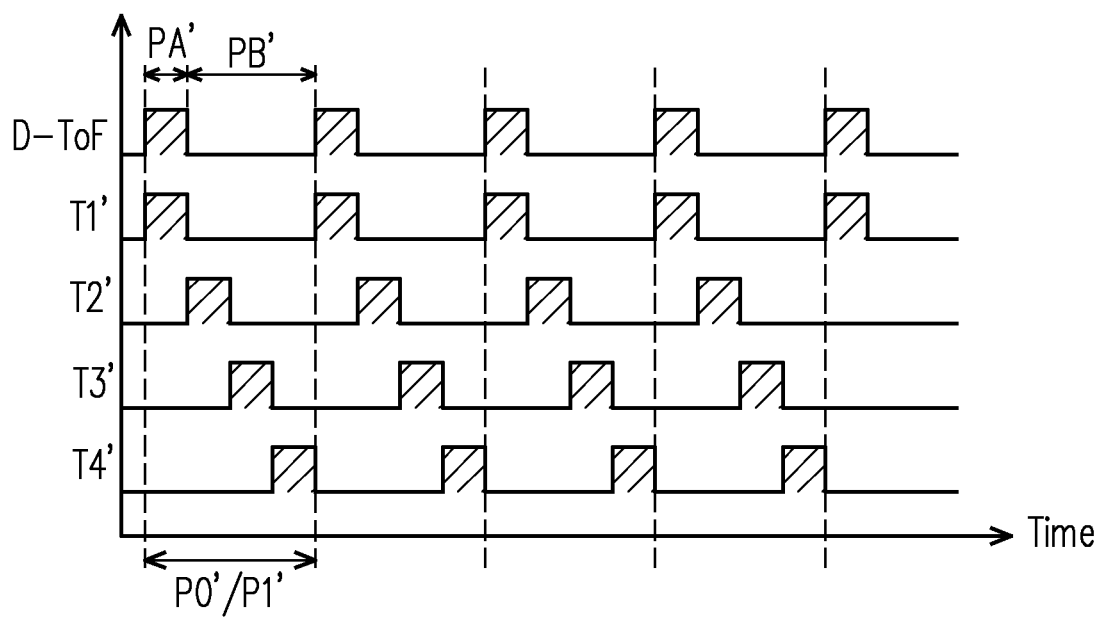
FIG. 4 illustrates a D-ToF signal time sequence according to an embodiment of the disclosure.

FIG. 4 illustrates a D-ToF signal time sequence according to an embodiment of the disclosure. With reference to FIG. 2 and FIG. 4, a time sequence D-ToF represents the time sequence of a periodic ranging operation performed by one single ToF module. According to the time sequence D-ToF, a length P0' of a D-ToF ranging cycle is equal to the sum of a time length PA' of sensing light (shown by the oblique lines) and a time length PB' of data transmission (not shown by the oblique lines). In the embodiment, the time length PA' of sensing light refers to the time length of the difference between the time at which a light emitting unit in the ToF module emits the sensing light and the time at which a light sensing unit in the ToF module receives the corresponding reflected light. The time length PB' of data transmission refers to the time length of outputting distance data from an ADC circuit in the ToF module. In the embodiment, the time sequences T1'-T4' respectively correspond to the time sequences at which the respectively ToF modules of the electronic devices 210-240 perform the periodic ranging operation.

Here, the ToF module of each of the electronic devices 210-240 performs the ToF ranging operation through the D-ToF ranging method. The D-ToF ranging method is to calculate the distance by calculating a time difference between the time of emitting the sensing light and the time of receiving the reflected light; therefore, the required response time is relatively short, and the time length PB' of data transmission is greater than the time length PA' of sensing light. In other words, since the time length PA' of sensing light is much shorter than the time length PB' of data transmission, a length P1' of an operation cycle during which each of the electronic devices 210-240 respectively performs the ToF ranging operation may be equal to a length P0' of the D-ToF ranging cycle.

In detail, with reference to the time sequences T1'-T4p, only after the light sensing operation by the electronic device 210 is completed, the electronic device 220 continues the light sensing operation. Similarly, after the light sensing operation by the electronic device 240 is completed, the electronic device 210 may just finish outputting distance data and directly continue to perform the next round of light sensing operation. In other words, the electronic devices 210-240 may sequentially perform the ranging operation according to the D-ToF ranging method, but the refresh rate does not descend in comparison with the embodiment depicted in FIG. 3. In addition, the sequence of the ToF ranging time slots refers to the sequence of the respective light sensing periods (shown by the oblique lines) in the time sequences T1'-T4'.

Figure 5:
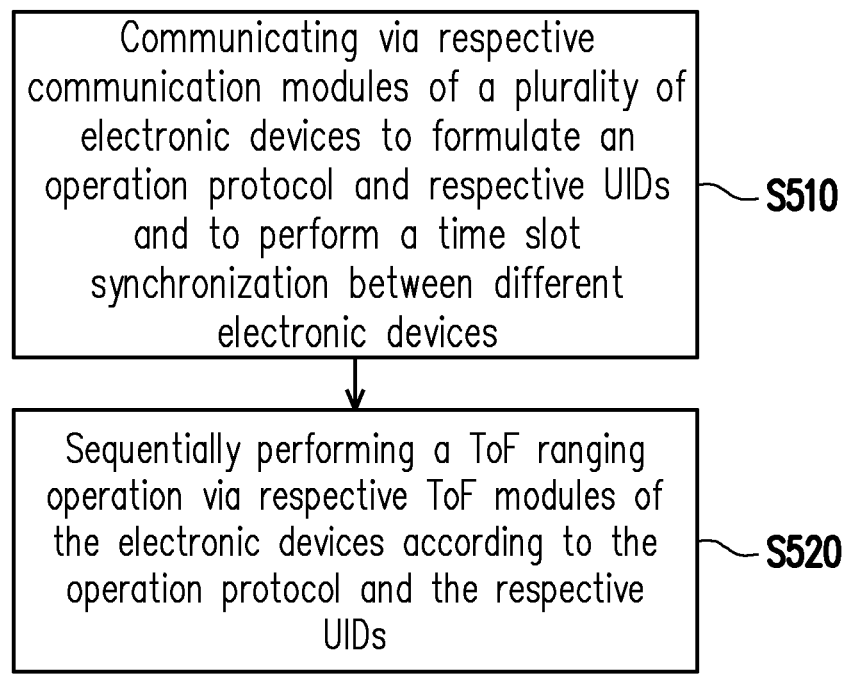
FIG. 5 is a flowchart of an operating method of a multimedia system according to an embodiment of the disclosure.

FIG. 5 is a flowchart of an operating method of a multimedia system according to an embodiment of the disclosure. With reference to FIG. 2 and FIG. 5, the operating method provided in the embodiment may be adapted to the multimedia system 200 depicted in FIG. 2. In step S510, electronic devices 210-240 communicate via respective communication modules to formulate an operation protocol and respective UIDs and to perform a time slot synchronization between different electronic devices. In step S520, the electronic devices 210-240 sequentially perform the ToF ranging operation via the respective ToF modules according to the operation protocol and the respective UIDs. Therefore, the operating method provided in the embodiment enables the electronic devices 210-240 in the multimedia system 200 to sequentially perform the ToF ranging operation without signal collision and misinterpretation.

In addition, other module features, implementations, or technical details of the multimedia system 200 and the electronic devices 210-240 provided in the embodiment may be referred to as those taught, disclosed, and suggested in the previous embodiments as depicted in FIG. 1 to FIG. 4 and thus will not be described hereinafter.

To sum up, the multimedia system applying ToF ranging and the operating method thereof as provided in one or more embodiments of the disclosure ensure effective and instant ranging through ToF ranging; besides, according to the multimedia system applying ToF ranging and the operating method thereof provided herein, the electronic devices in the multimedia system may communicate via respective communication modules to formulate the operation protocol and respective UIDs, and then the ToF ranging operation is sequentially and respectively performed without signal collision and misinterpretation.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A multimedia system applying time of flight ranging and comprising:
   a plurality of electronic devices, each comprising:
      a processing module;
      a time of flight module coupled to the processing module and configured to perform a time of flight ranging operation; and
      a communication module coupled to the processing module and configured to perform wireless communication,
   wherein the electronic devices communicate via the respective communication modules to formulate an operation protocol and respective unique identifiers and to perform a time slot synchronization between different electronic devices, and the electronic devices perform the time of flight ranging operation sequentially via the respective time of flight modules according to the operation protocol and the respective unique identifiers, wherein the operation protocol comprises a sequence of a plurality of time of flight ranging time slots of the electronic devices, and the time of flight ranging time slots are not overlapped with each other,
   wherein the time of flight module of each of the electronic devices performs the time of flight ranging operation through an indirect time of flight ranging method or a direct time of flight ranging method,
   wherein a length of an operation cycle during which each of the electronic devices performs the time of flight ranging operation is greater than or equal to a sum of a time length of sensing light and a time length of data transmission.

2. The multimedia system according to claim 1, wherein the time of flight module of each of the electronic devices performs the time of flight ranging operation through the indirect time of flight ranging method, and the length of an operation cycle during which each of the electronic devices performs the time of flight ranging operation is greater than a length of an indirect time of flight ranging cycle, wherein the length of the indirect time of flight ranging cycle is equal to the sum of a time length of sensing light and a time length of data transmission, and the time length of sensing light is greater than the time length of data transmission.

3. The multimedia system according to claim 1, wherein the time of flight module of each of the electronic devices performs the time of flight ranging operation through the direct time of flight ranging method, and the length of an operation cycle during which each of the electronic devices performs the time of flight ranging operation is equal to a length of a direct time of flight ranging cycle, wherein the length of the direct time of flight ranging cycle is equal to the sum of a time length of sensing light and a time length of data transmission, and the time length of sensing light is less than the time length of data transmission.

4. The multimedia system according to claim 1, wherein the multimedia system is a virtual reality system or an augmented reality system.

5. An operating method of a multimedia system applying time of flight ranging and comprising:
communicating via respective communication modules of a plurality of electronic devices to formulate an operation protocol and respective unique identifiers and to perform a time slot synchronization between different electronic devices; and
sequentially performing a time of flight ranging operation via respective time of flight modules of the electronic devices according to the operation protocol and the respective unique identifiers, wherein the operating protocol comprises a sequence of a plurality of time of flight ranging time slots of the electronic devices, and the time of flight ranging time slots are not overlapped with each other,
wherein the time of flight module of each of the electronic devices performs the time of flight ranging operation through an indirect time of flight ranging method or a direct time of flight ranging method,
wherein a length of an operation cycle during which each of the electronic devices performs the time of flight ranging operation is greater than or equal to a sum of a time length of sensing light and a time length of data transmission.

6. The operating method according to claim 5, wherein the time of flight module of each of the electronic devices performs the time of flight ranging operation through the indirect time of flight ranging method, and the length of an operation cycle during which each of the electronic devices performs the time of flight ranging operation is greater than a length of an indirect time of flight ranging cycle, wherein the length of the indirect time of flight ranging cycle is equal to the sum of a time length of sensing light and a time length of data transmission, and the time length of sensing light is greater than the time length of data transmission.

7. The operating method according to claim 5, wherein the time of flight module of each of the electronic devices performs the time of flight ranging operation through the direct time of flight ranging method, and the length of an operation cycle during which each of the electronic devices performs the time of flight ranging operation is equal to a length of a direct time of flight ranging cycle, wherein the length of the direct time of flight ranging cycle is equal to the sum of a time length of sensing light and a time length of data transmission, and the time length of sensing light is less than the time length of data transmission.

8. The operating method according to claim 5, wherein the multimedia system is a virtual reality system or an augmented reality system.

* * * * *